April 14, 1970     H. S. HOLLNAGEL     3,506,097
DISC BRAKE CALIPER UNIT
Filed Aug. 12, 1968
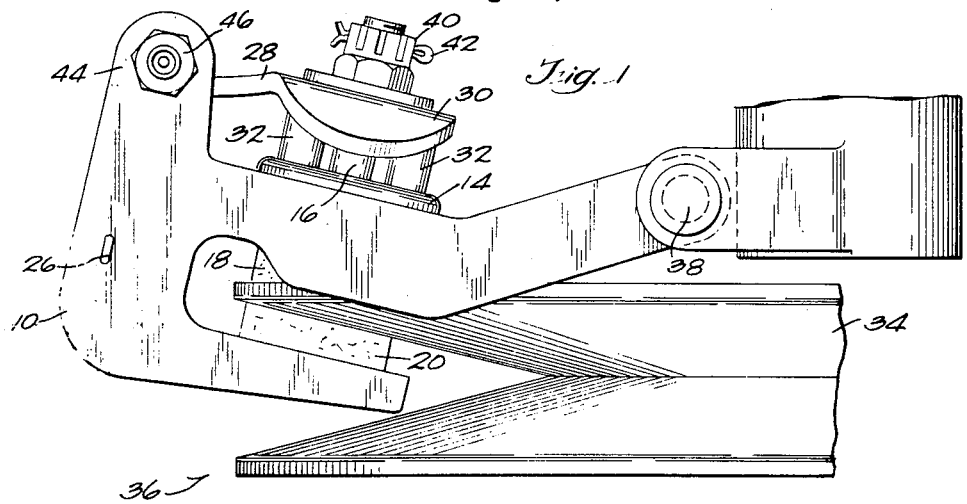
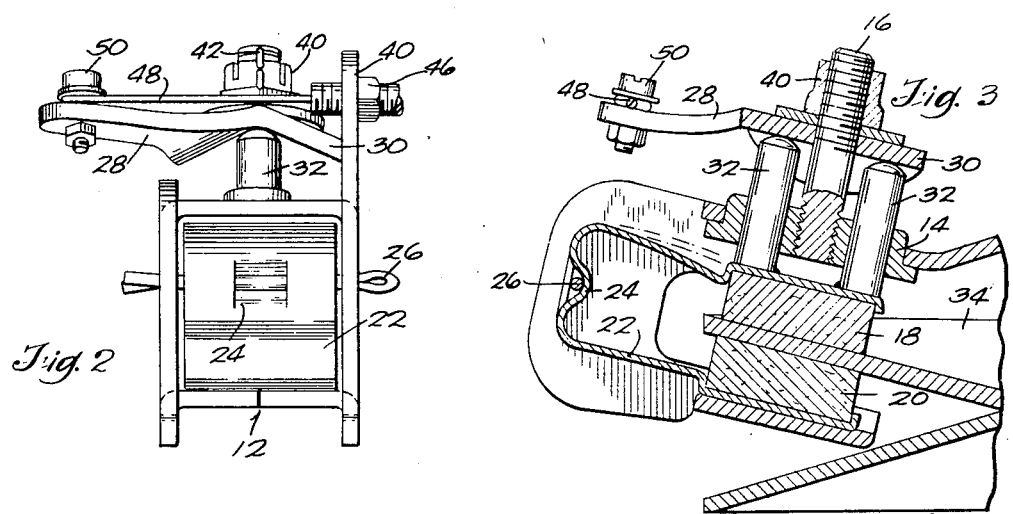
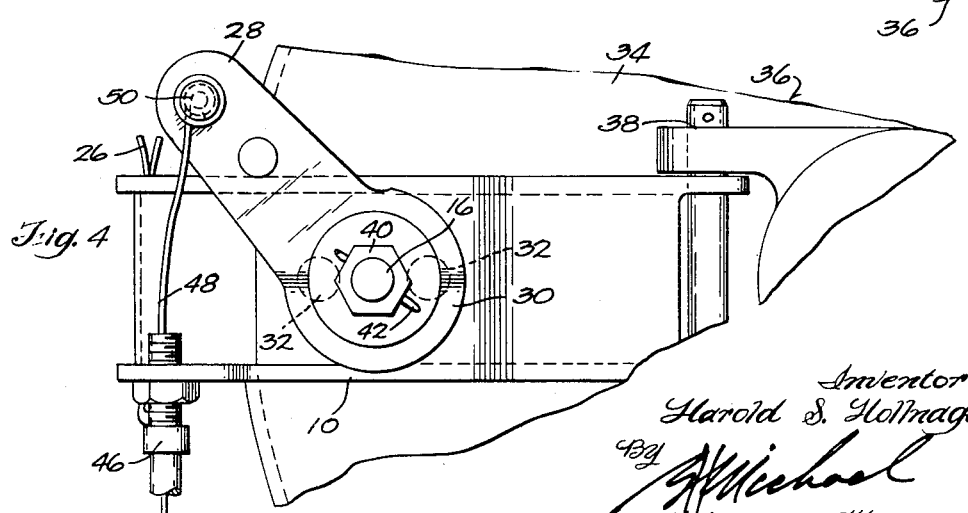
Inventor
Harold S. Hollnagel
By
Attorney United States Patent Office 3,506,097
Patented Apr. 14, 1970

3,506,097
DISC BRAKE CALIPER UNIT
Harold S. Hollnagel, Milwaukee, Wis., assignor, by mesne assignments, to Kelsey-Hayes Company, Romulus, Mich., a corporation of Delaware
Filed Aug. 12, 1968, Ser. No. 752,036
Int. Cl. F16d 55/00
U.S. Cl. 188—73          1 Claim

ABSTRACT OF THE DISCLOSURE

The disc brake pads are carried by a generally U-shaped, resilient mounting member which serves both the support and brake release functions while retaining the pads in the frame unit which is fabricated from a stamped and formed plate completed by a single, short weldment. The actuating arm is rotated to cam the actuating pins against the adjacent portion of the pad mount. The pins are mounted in a guide block riveted in the frame.

BACKGROUND OF THE INVENTION

With the growing appreciation of the merits of disc brakes, such brakes are being applied in many new fields of use. The application of disc brakes to lower powered units and to more competitive fields has resulted in a need for a low cost, efficient brake caliper unit.

SUMMARY OF INVENTION

The main frame of the present caliper unit is stamped from sheet steel and then formed to the illustrated shape with a simple, short weld completing the fabrication of the frame per se. Since the frame ends up with channel shapes it has all the requisite strength. The brake pads are mounted on and carried by the U-shaped, spring steel carrier which is held in place simply by a cotter pin or the like passing through formed eyelets. The brake pad assembly can be simply removed by pulling the cotter pin out and sliding the brake pad carrier from the frame. Thus it is a simple matter for the user to easily and rapidly replace worn brake pads. The cast aluminum guide block is riveted in the housing and supports the shaft upon which the cam and its associated arm rotate to actuate the push pins against the brake pads. The user can adjust the brake simply by adjusting one nut to adjust the push pins in or out as indicated. An arm extending from the frame carries the push-pull cable support.

DESCRIPTION OF DRAWINGS

FIG. 1 is a top plan view of the brake assembly mounted in position where it can grip one half of a sheave.

FIG. 2 is an end view from the left of FIG. 1 but is restricted to the brake unit itself.

FIG. 3 is a horizontal section.

FIG. 4 is a side view taken from the top side of FIG. 1.

DESCRIPTION OF PREFERRED EMBODIMENT

The frame 10 is stamped from flat steel, then formed and finally welded at 12 to complete fabrication of the frame. The cast guide block 14 is rivited in place with the threaded pivot pin 16 projecting therefrom. The brake pads 18, 20 are mounted on the generally U-shaped, spring steel mount 22. The mount is formed to make a guide eye 24 through which cotter pin 26 passes to secure the mount in place between the end web portions of the frame, which portions are flat and parallel to afford easy access to the mount. The mount, being resilient, tends to spread the pads apart. The brake is actuated by rotating arm 28 on pivot pin 16 to cause the formed cam 30 to act against push pins 32, 32 slidably guided in block 14 so that the pins are pushed against pad 18 to move it towards pad 20 to capture the sheave half or disc therebetween. In the present case the disc is one half 34 of V-belt sheave 36. The frame is carried on pivot pin 38 passing through the arm portions and connecting frame 10 to the stationary structure associated with the V-belt sheave. This allows the frame to "float" relative to the sheave to equalize pad pressure. It will be noted that frame 10 is bent to accommodate the angle of the sheave half. If used with a conventional disc this would not be required.

Nut 40 is turned in or out to adjust the position of cam 30 relative to the pins and thus adjust the brakes. After the brakes have been adjusted cotter pin 42 is passed through the split portion of the nut to lock it in place. The upper portion of the frame is provided with a projecting ear 44 in which the end fixture 46 of the push-pull cable assembly is mounted with the cable 48 being connected at 50 to the end of the arm.

It will be appreciated that changing the brake pads is a very simple matter involving only the removal of cotter pin 26 to slide out the worn brake pads on the resilient mount for replacement by a new mount and pad assembly. Thus the brakes are admirably suited to user replacement and are ideal for the simpler type vehicles sold to the public such as motor scooters, snowmobiles and the like.

I claim:
1. A disc brake caliper unit comprising
   a frame stamped and formed to provide opposing channel members interconnected by webbing permitting free access to the space between the channel members, said frame being pivotally mounted to a fixed support,
   a resilient mounting member of generally U-shaped configuration mounted only to and in the frame by a pin passing through the member and the frame,
   brake pads carried by the mounting member facing each other and biased apart by the resilient mounting member,
   a cam member directly rotatably carried by the frame and having a cam portion effective upon rotation of the cam member, and
   a push pin between the cam member and the mounting member for transmitting motion from the cam member to the mounting member upon rotation of the cam member for actuating one of the pads towards the other against the self-bias of the mounting member.

References Cited

UNITED STATES PATENTS

| | | | |
|---|---|---|---|
| 3,109,518 | 11/1963 | Chouings | 188—73 |
| 3,182,753 | 5/1965 | Gancel | 188—73 |
| 3,258,089 | 6/1966 | Hayes et al. | 188—73 |
| 3,279,564 | 10/1966 | Gancel | 188—73 |
| 3,292,739 | 12/1966 | Ulbing | 188—73 |
| 3,358,793 | 12/1967 | Hollnagel et al. | 188—73 |

FOREIGN PATENTS

| | | |
|---|---|---|
| 926,992 | 5/1963 | Great Britain. |
| 989,237 | 4/1965 | Great Britain. |

GEORGE E. A. HALVOSA, Primary Examiner